United States Patent [19]
Tayama

[11] Patent Number: 5,699,129
[45] Date of Patent: Dec. 16, 1997

[54] METHOD AND APPARATUS FOR MOTION VECTOR DETERMINATION RANGE EXPANSION

[75] Inventor: Masashi Tayama, Sunnyvale, Calif.

[73] Assignee: Zapex Technologies, Inc., Mountain View, Calif.

[21] Appl. No.: 810,906

[22] Filed: Mar. 5, 1997

Related U.S. Application Data

[63] Continuation of Ser. No. 544,307, Oct. 17, 1995, abandoned.

[51] Int. Cl.⁶ .................................................. H04N 7/32
[52] U.S. Cl. ............................................ 348/699; 348/420
[58] Field of Search .............................. 348/384, 390, 348/400–402, 407, 409–413, 415, 416, 420, 699; 382/232, 236, 238; H04N 7/137

[56] References Cited

U.S. PATENT DOCUMENTS

| | | | |
|---|---|---|---|
| 4,958,226 | 9/1990 | Haskell et al. | 348/416 |
| 5,235,419 | 8/1993 | Krause | 348/416 |
| 5,317,397 | 5/1994 | Odaka et al. | 348/416 |
| 5,398,078 | 3/1995 | Masuda et al. | 348/413 |
| 5,412,430 | 5/1995 | Nagata | 348/407 |
| 5,469,226 | 11/1995 | David et al. | 348/699 |
| 5,489,949 | 2/1996 | Jeong et al. | 348/699 |
| 5,493,344 | 2/1996 | Yu | 348/699 |

*Primary Examiner*—Richard Lee
*Attorney, Agent, or Firm*—Blakely, Sokoloff, Taylor & Zafman LLP

[57] ABSTRACT

Video compression systems often use motion compensation to compress the data. Motion compensation systems usually use motion vectors to represent motion. A multipass motion vector determination unit is introduced that makes more then one pass to select a motion vector. The multipass motion vector determination unit first examines an initial search window area around each macroblock to select a first motion vector for each macroblock. The multipass motion vector determination unit then determines a second search window for each macroblock based upon the first motion vector found for that macroblock. Specifically, the second search window consist of an area located in the direction of the first motion vector. A second motion vector is selected from the second search window. Additional motion vectors may similarly be selected. Finally, the multipass motion vector determination unit then selects a final motion vector from the motion vector collected by finding the motion vector having the smallest summation of absolute difference value.

8 Claims, 5 Drawing Sheets

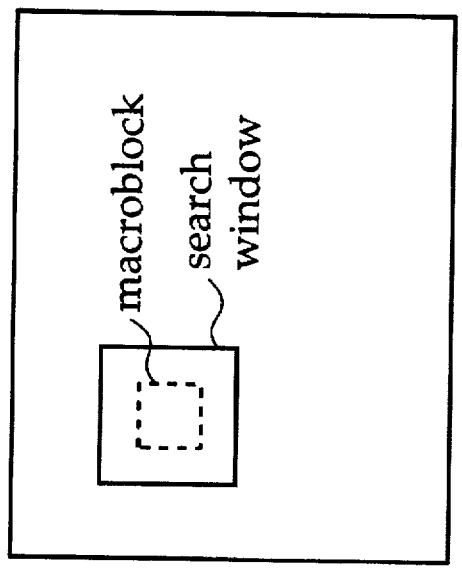
*Figure 2b - Prior Art*
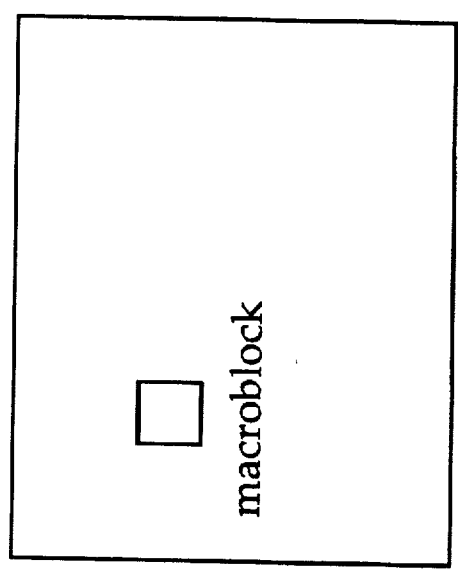
*Figure 2a*

*Figure 3b - Prior Art*

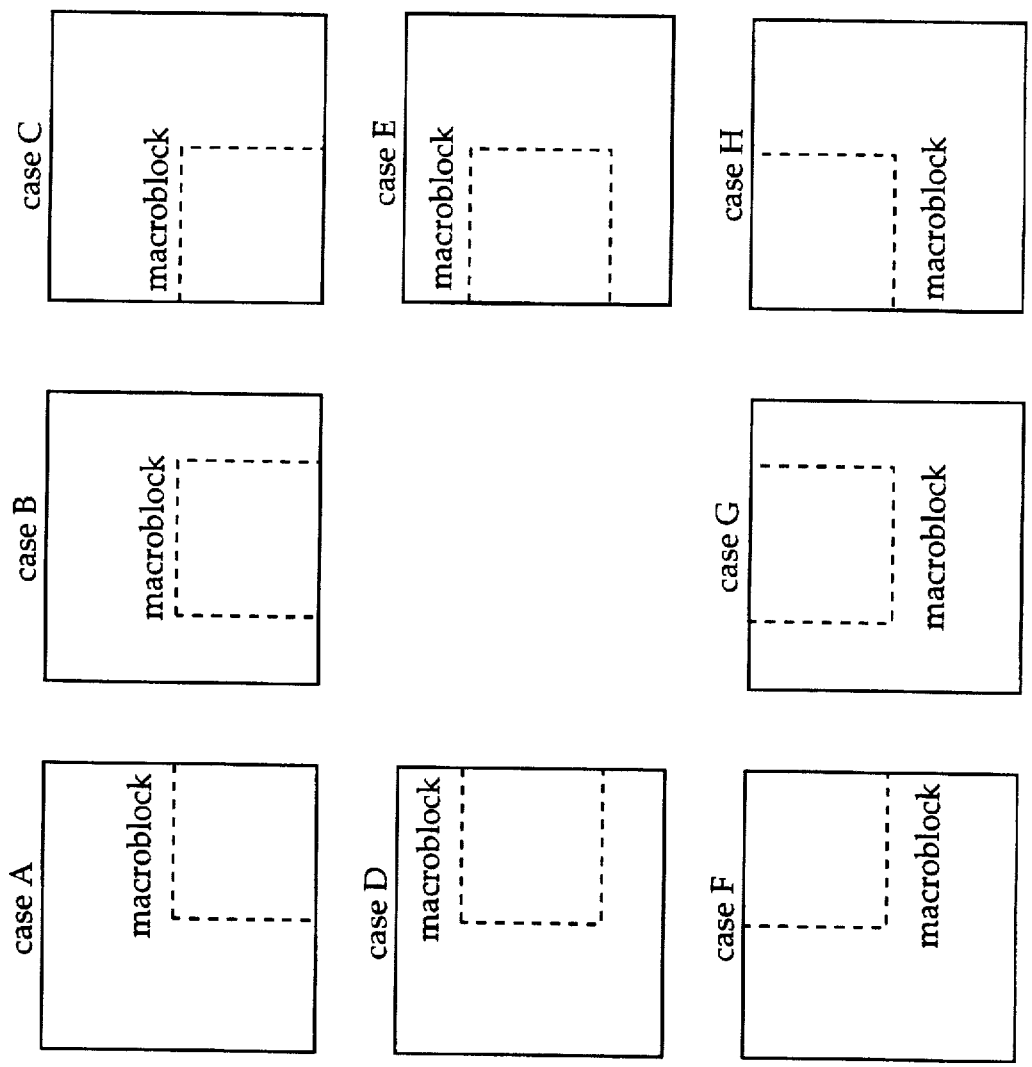

METHOD AND APPARATUS FOR MOTION VECTOR DETERMINATION RANGE EXPANSION

This is a continuation of application Ser. No. 08/544,307, filed Oct. 17, 1995, now abandoned.

FIELD OF THE INVENTION

The present invention relates to the field of video compression. Specifically, the present invention discloses a method of selecting motion vectors during the motion estimation portion of an MPEG encoder.

BACKGROUND OF THE INVENTION

Video compression systems require a usually implement several different techniques to reduce the amount of data contained in each video frame. Motion estimation is one of the key compression techniques. Motion estimation takes advantage of the temporal redundancy in adjacent video frames. If previously sent or stored frame (reference frame) data is similar to the current frame data, then it is possible to represent the current frame as the previous frame plus the difference data between two frames. This technique significantly reduces the amount of data required to represent a video frame. However, when a video frame contains moving objects, this method is not so effective.

To reduce the amount of data required to store moving scenes, it is very important to determine the motion direction and amount. The MPEG video compression systems quantify this factor as a motion vector. A motion vector describes the direction of motion and the speed of the motion. Specifically, each frame of video is divided into 16×16 pixel macroblocks called macroblocks and then a motion vector is determined for each macroblock. The motion vector describes the motion of the macroblock relative to a previous or later frame.

Motion vectors are determined by searching an area around the macroblock in a previous or later video frame (the reference frame). The motion vector is selected by choosing the area in the previous or later frame that most closely resembles the macroblock. FIG. 2b illustrates the relationship between macroblock and a typical search window. In this example search window, the search window size is 31×31 pixels and the macroblock is located at the center of the search window. To select a motion vector, each 16×16 pixel macroblock in the search window is examined and a summation of absolute difference value (SAD) is calculated. Since there are 256 search possible macroblocks in the 31×31 pixel search window, 256 summation of absolute difference values are calculated. The macroblock having the smallest summation of absolute difference value is selected and the spatial offset from the location of current macroblock to this selected macroblock is the motion vector. This vector is shown in FIG. 3b.

To implement the motion vector determination, a dedicated motion vector detection (MVD) large scale integrated circuit (LSI) is often used. The SGS-Thomson STI3220 is a typical motion vector detection large scale integrated circuit. The SGS-Thomson STI3220 integrated circuit takes macroblock data as one input and search window data as another input. The SGS-Thomson STI3220 integrated circuit outputs the optimum motion vector value and the corresponding summation of absolute difference value. If the motion between frames exceeds the limits of the search window, then it not possible to locate the optimum motion vector. It is therefore desirable to expand the size of the search window for efficient motion compensation.

One method of expanding the search window area is to use multiple motion vector detection integrated circuits simultaneously. Each motion vector detection integrated circuit would search a different area. However, using multiple motion vector detection integrated circuits increases the hardware complexity and greatly increases the cost of the encoder.

Another method of expanding the search window area is to use same multiple motion vector detection integrated circuit successively to search many different search windows for a particular macroblock. However, if many different search windows are examined, then the encoder will not be able to work in real time.

Thus, it would be desirable implement a motion vector determination circuit that would efficiently expand the search window for each macroblock.

SUMMARY OF THE INVENTION

It is therefore an object of the present invention to efficiently increase the search window area for a motion vector detection circuit.

This and other objectives are achieved by the multipass motion vector determination unit of the present invention. The multipass motion vector determination unit of the present invention first examines a search window area around each macroblock to select a first motion vector for each macroblock. The multipass motion vector determination unit of the present invention then determines a second search window for each macroblock based up the first motion vector found for that macroblock. Specifically, the second search window consists of an area located in the direction of the first motion vector. A second motion vector is selected from the second search window. The multipass motion vector determination unit then selects a final motion vector from the first motion vector and the second motion vector depending upon which motion vector has the smaller summation of absolute difference value.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

FIG. 2a illustrates a single macroblock in a frame.

FIG. 2b illustrates a search window in a reference frame that is searched to determine a motion vector.

FIG. 3b illustrates a macroblock within a search window and a motion vector to a similar macroblock within the search window.

FIG. 4 illustrates the eight other possible search windows that will be searched depending on the results of the first motion vector search.

DETAILED DESCRIPTION

A method and apparatus for determining motion vectors in an video encoder is disclosed. In the following description, for purposes of explanation, specific nomenclature is set forth to provide a thorough understanding of the present invention. However, it will be apparent to one skilled in the art that these specific details are not required in order to practice the present invention. For example, the present invention will be described with reference to the MPEG-2 digital video encoding standard, however the teachings of the present invention can be used in other systems that implement motion estimation. In other instances, well known circuits and devices are shown in block diagram form in order not to obscure the present invention unnecessarily.

MPEG Video Encoding

The MPEG-2 digital video encoding standard generally divides each frame of video into pixel macroblocks. Each pixel macroblock is a small rectangular area that comprises part of a complete frame. MPEG-2 video encoders, encode each macroblock and the encoded macroblocks are combined to create an encoded video frame. In a full MPEG system, the MPEG video data is combined with MPEG audio data in a MPEG system encoder.

Figure 1:
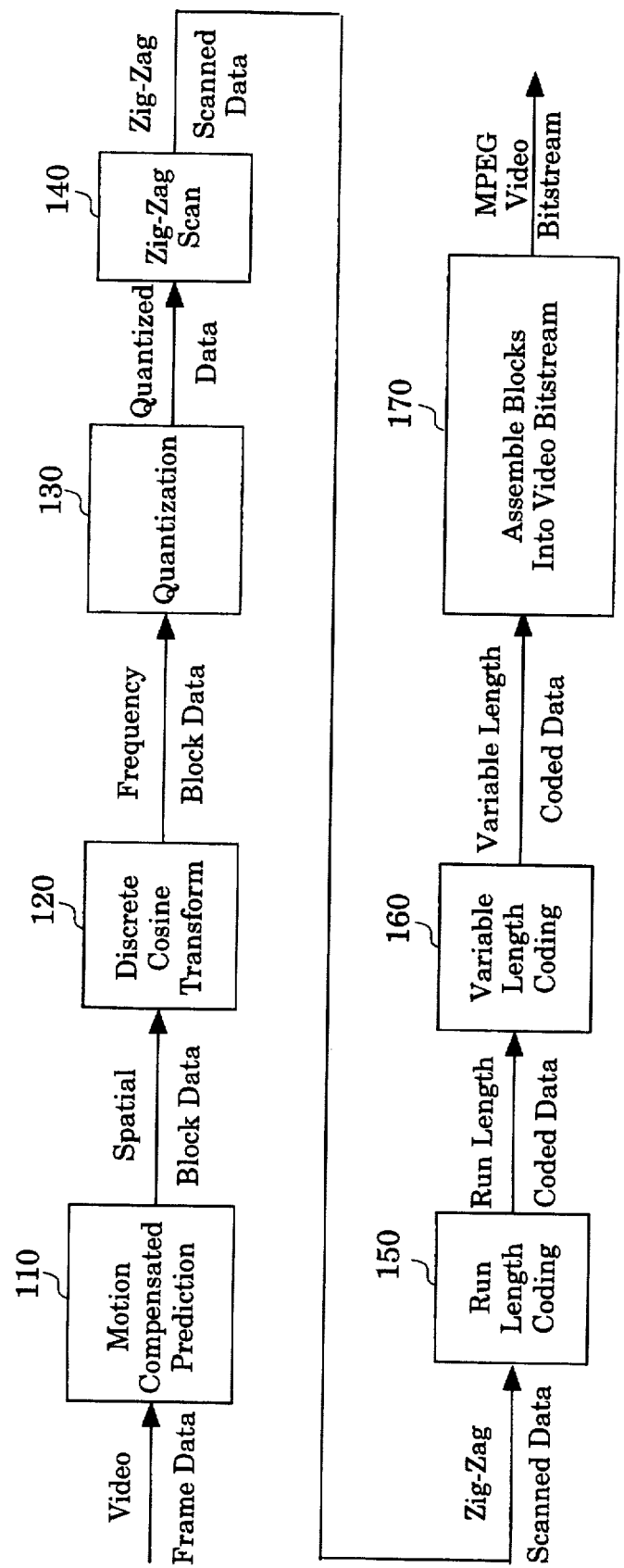
FIG. 1 illustrates a summary of the MPEG 2 video encoding process.

FIG. 1 illustrates a flow diagram that lists the encoding steps performed on each macroblock by an MPEG-2 video encoder. Video data is first streamed into Motion Compensation Prediction unit 110. The output of the Motion Compensation Prediction 110 unit is a spatial macroblock data. The spatial macroblock data is then processed by a discrete Cosine Transformer (DCT) unit 120. DCT unit 120 changes the information from a spatial domain to a frequency domain. The output of DCT 120 is a frequency macroblock data that is streamed into Quantization unit 130. Quantization unit 130 quantizes the data and the quantized data will then be zig-zag scanned, run-length encoded and finally variable length encoded by Variable Length Encoder unit 160. The output of Variable Length Encoder unit 160 is then processed by MPEG-2 Video Stream Construction Unit 170 and assembled into an MPEG-2 Video bitstream. More detailed information about MPEG-2 encoding can be found in the following documents:

1) ISO/IEC-11171-1—PART 1: SYSTEMS, INFORMATION FOR DIGITAL STORAGE
2) ISO/IEC-11171-2—PART 2: VIDEO, INFORMATION TECHNOLOGY—CODING OF MOVING PICTURES & ASSOCIATED AUDIO FOR DIGITAL STORAGE
3) ISO/IEC-11171-1—PART 3: AUDIO, INFORMATION TECHNOLOGY—CODING OF MOVING PICTURES & ASSOCIATED AUDIO FOR DIGITAL STORAGE
4) ISO/IEC-CD-11171—INFORMATION TECHNOLOGY—CODING OF MOVING PICTURES & ASSOCIATED AUDIO FOR DIGITAL STORAGE
5) ISO/IEC 13818-1, ITU-T H.222: SYSTEMS
6) ISO/IEC 13818-2, ITU-T H.262: VIDEO
7) ISO/IEC 13818-3: AUDIO

Referring again to FIG. 1, the first step is to perform Motion compensation prediction or intra-frame encoding on the macroblock. Motion compensation prediction is the process of determining a macroblock in a previous or later frame that is very similar to a macroblock being analyzed in the current frame. In some frames, no motion compensation prediction is performed and the entire frame is encoded without reference to other frames. Such frames are known as intra-frames or I-frames. The output of the Motion compensation prediction or intra-frame encoding stage is a spatial macroblock data.

FIG. 2a illustrates a single macroblock from a current frame. To represent the macroblock in the current frame the Motion Compensation Prediction unit 101 of an MPEG encoder searches for a similar type of macroblock in a previous or following frame. The previous or following frame is referred to as the reference frame. To limit the amount of area that needs to be searched most MPEG video encoders only search a small search window. FIG. 2b illustrates a small search window in a reference frame that is searched to find a macroblock similar to the macroblock of the current frame. The reference frame is a frame before or after the current frame. As illustrated in FIG. 2b, the search window comprises a small area surrounding the location of the macroblock in the current frame.

To select the optimum motion vector for a macroblock, it is desirable to increase the size of the search window. However, increasing the size of the search window usually requires additional circuitry such that the cost is increased or additional search time such that the unit will not operate in real time.

A Multistage Motion Estimation Unit

The present invention introduces a multistage motion estimation unit. The multistage motion vector determination unit of the present invention performs two or more searches in different search windows to select a motion vector. The present invention will be described with reference to a two stage motion estimation unit, however, additional search stages could be added. The operation of the multistage motion vector determination unit of the present invention is best explained by describing its operation.

Figures 3A, 3C:
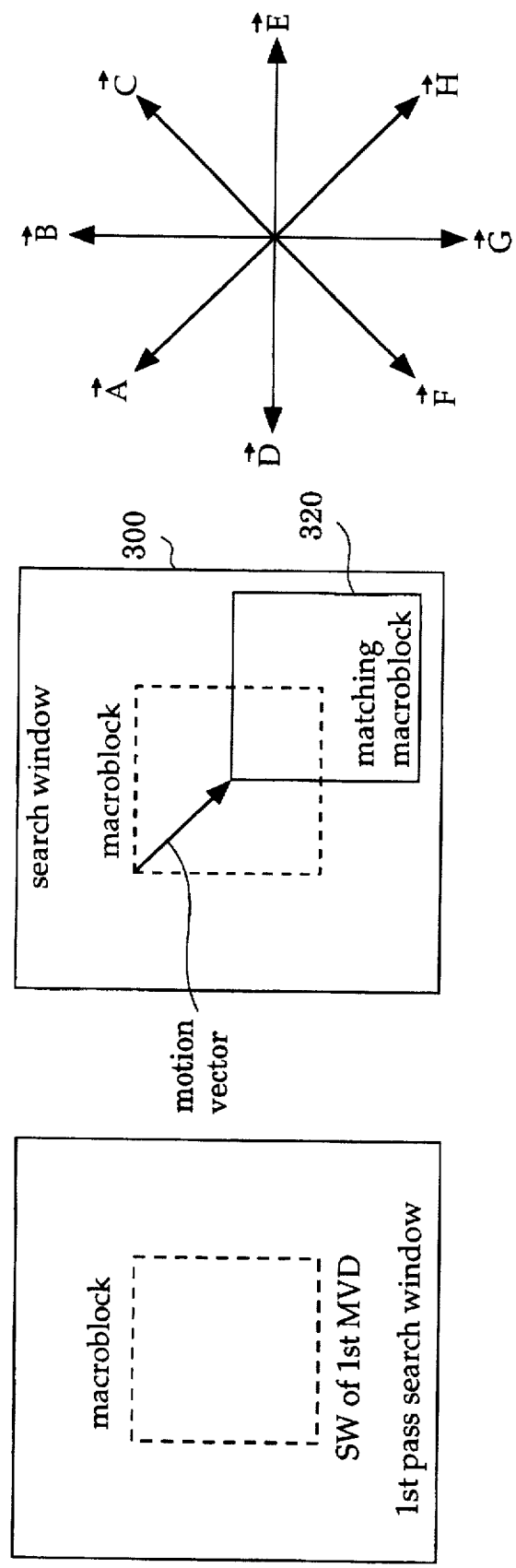
FIG. 3a illustrates a macroblock within a search window.
FIG. 3c illustrates eight possible different directions to move to search for another motion vector.

FIG. 3a illustrates a dotted macroblock from a current frame and a first pass search window from a reference frame. As illustrated in FIG. 3a the first pass search window in the reference frame comprises an area surrounding the macroblock of the current frame.

In the present invention, during a first pass the motion vector determination unit searches the first pass search window comprising area immediately surrounding the macroblock of the current frame. When the motion vector determination unit finds a macroblock in the search window that most closely resembles the macroblock from the current frame, the motion vector determination unit defines the motion vector to be the distance and direction from the macroblock of the current frame to the matching macroblock of the reference frame. For example, FIG. 3b illustrates a matching macroblock of the reference frame. The motion vector is defined by the direction and distance that the original macroblock would need to be moved to occupy the same spatial position as the matching macroblock. The motion vector that is selected during the first pass is then stored in a memory unit.

After the first pass of the motion vector determination unit, the motion vector determination unit then goes through and examines all the found motion vectors and determines a second search window to search for each macroblock. The search window area of the second search pass is selected based upon on the results of the first search pass. Specifically, the motion vector found during the first search determines the search window that will be searched during the second search.

To determine the search window area of the second pass, the motion vector of the first pass is compared with the vectors illustrated in FIG. 3c. Specifically, the motion vector from the first pass is correlated with the different vectors of FIG. 3c to determine which vector it most closely matches up with. This can be done by performing a vector dot product between the motion vector and the vectors a–h of FIG. 3c and selecting the vector that produces the greatest dot product. A dot product is defined as follows $\vec{X} \bullet \vec{Y} = |\vec{X}||\vec{Y}|\cos \Phi$ (where $\Phi$ is the angle between $\vec{X}$ and $\vec{Y}$). For example, when a dot product is calculated between the motion vector of FIG. 3b and the vectors $\vec{A}$ through $\vec{H}$ of FIG. 3c, the vector producing the greatest dot product will be vector $\vec{H}$.

FIG. 4 illustrates the possible search windows that might be searched during the second pass of the motion estimation unit. After selecting one of the vectors, $\vec{A}$ through $\vec{H}$ of FIG. 3c, one of the search windows of case A through H will be selected correspondingly to the chosen vector, $\vec{A}$ through $\vec{H}$ from the first pass. As illustrated in FIG. 4, the second pass search window that is selected will encompass an area in the direction of the motion vector that was selected during the first pass. Thus, the second search window comprises different search area than the first pass search window that was centered on the macroblock. is relatively small, it may not be adequately large to compensate large amounts of motion. However, the first pass might indicate the direction of motion by selecting a closely matching macroblock. To compensate for large amounts of motion, the second pass will search a different search area in the direction of the motion vector found during the first pass. Thus, the second pass represents an intelligent decision on where to search further for a matching macroblock in a reference frame.

An Implementation of the Revised Motion Estimation Unit

Figure 5:
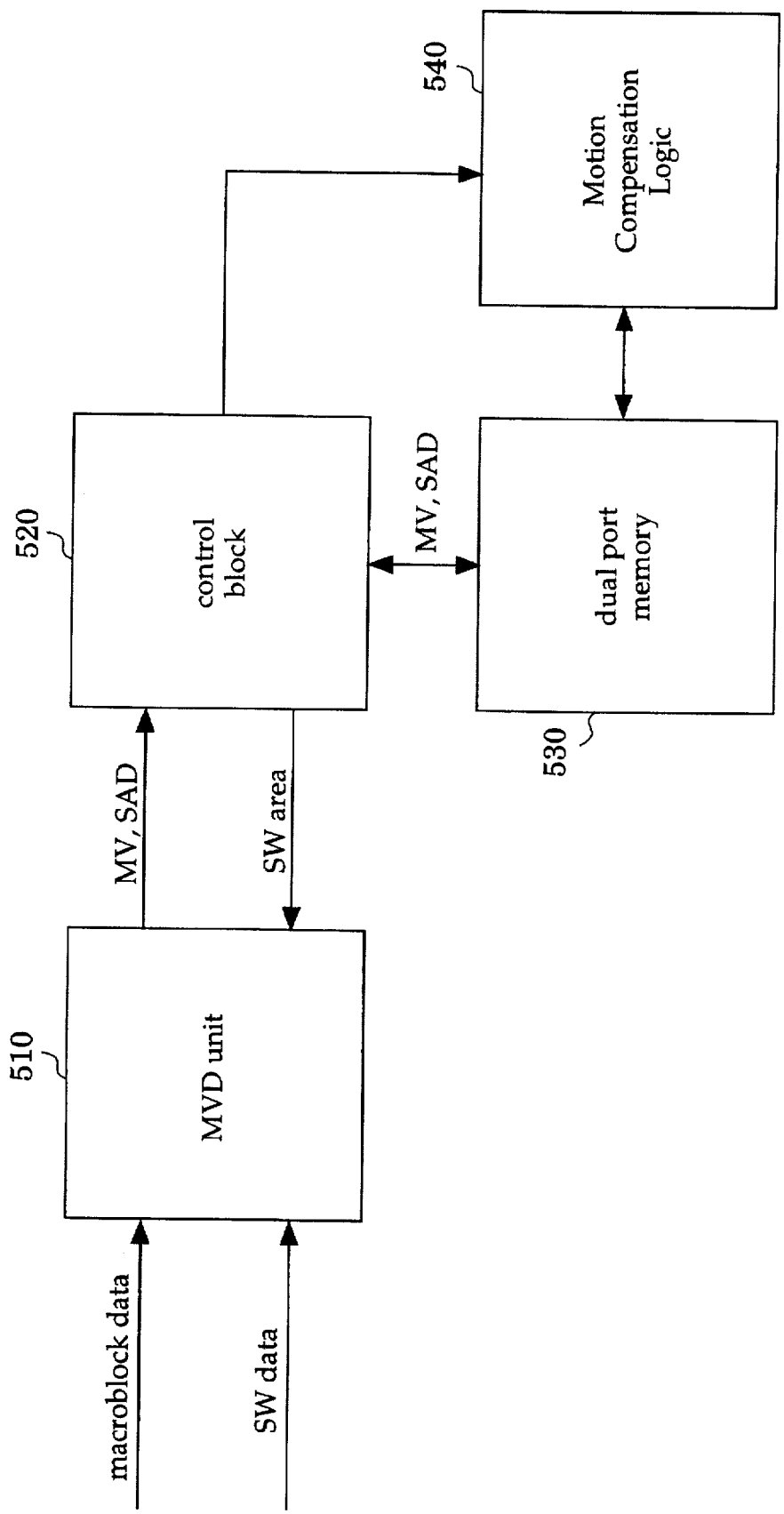
FIG. 5 illustrates a block diagram of an implementation of the motion vector determination system of the present invention.

FIG. 5 illustrates a block diagram of an implementation of the motion vector determination unit of the present invention. The motion vector determination unit consists of motion vector determination unit 510, control logic 520, dual port memory 530, and motion compensation logic 540.

The motion vector determination unit 510 does the actual searching of a search window to select the best motion vector. The motion vector determination unit 510 may consist of a dedicated motion vector determination integrated circuit such as SGS-Thomson's STI3220. The motion vector determination unit 510 uses the macroblock data as one input and the search window data as another input. After searching the area of the search window, the motion vector determination unit 510 passes the selected motion vector and the associate summation of absolute difference value to the control logic 520.

The control logic 520 stores the motion vector and summation of absolute difference information into the dual port memory 530. The motion vector determination unit 510 and the control logic 520 cooperate and perform motion vector searches for an entire frame first during a first pass. The motion vector and summation of absolute difference result information. is stored in the dual port memory 530 during the first pass.

The motion vector determination unit 510 and the control logic 520 then perform a second motion vector determination pass. During the second pass the control logic 520 examines the motion vector from the first pass for each macroblock and uses it to select a search window area to be searched during the second pass as previously described. The control logic 520 informs the motion vector determination unit 510 about the location the second pass search window. The motion vector determination unit searches the new search window area and passes the motion vector and summation of absolute difference information back to the control logic 520.

The control logic 520 then determines which motion vector to use. Specifically, the control logic 520 determines if the motion vector from the second pass has a smaller summation of absolute difference value than the motion vector from the first pass. If the motion vector from the second pass has the smaller summation of absolute difference value, then it overwrites the motion vector and the summation of absolute difference value stored in the dual port memory 530 during the first pass. Once the second pass is completed, the control logic 520 informs the motion compensation logic 540 about the motion vectors and summation of absolute difference information stored in the dual port memory 530 such that they are available to be used by the later stages of the video encoding process.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for selecting motion vectors in a motion estimation unit, said method comprising the steps of:

selecting a first motion vector for a macroblock by searching a first search window of a reference frame;

searching a second search window of said reference frame for a second motion vector for said macroblock, said second search window comprising a different area of said reference frame than said first search window, said different area of said reference frame of said second search window dependent upon said first motion vector; and selecting a final motion vector, said final motion vector being said first motion vector if a first summation absolute difference value associated with said first motion vector is smaller than a second summation absolute difference value associated with said second motion vector, else said final motion vector being said second motion vector.

2. The method claimed in claim 1 wherein said first search window comprises an area around said macroblock.

3. The method claimed in claim 1 wherein the area of said second search window comprises an area in a direction closely corresponding to said first motion vector relative to said macroblock.

4. The method claimed in claim 1 wherein said first search window comprises a rectangular area of said reference frame centered on said macroblock.

5. An apparatus for selecting motion vectors, said apparatus comprising the elements of:

a motion vector determination unit, said motion vector determination unit selecting a motion vector based upon a source macroblock and a reference frame;

a memory unit for storing motion vectors;

control logic, said control logic instructing said motion vector determination unit to select a first motion vector based upon a first source macroblock and a first search window of said reference frame, said control logic instructing said motion vector determination unit to select a second motion vector based upon said first source macroblock and a second search window of said reference frame, said second search window comprising a different area than said first search window, said different area of said second search window based upon said first motion vector; and said control logic selects a final motion vector, said final motion vector being said first motion vector if a first summation absolute difference value associated with said first motion vector is smaller than a second summation absolute difference value associated with said second motion vector, else said final motion vector being said second motion vector.

6. The apparatus claimed in claim 5 wherein said first search window comprises an area around said first source macroblock.

7. The apparatus claimed in claim 5 wherein the area of said second search window comprises an area in a direction closely corresponding to said first motion vector.

8. The apparatus claimed in claim 5 wherein said first search window comprises a rectangular area around said first source macroblock.

* * * * *